UNITED STATES PATENT OFFICE.

THOMAS SPENCER, OF SYRACUSE, NEW YORK.

IMPROVEMENT IN MANUFACTURE OF COMMON SALT.

Specification forming part of Letters Patent No. 28,513, dated May 29, 1860.

*To all whom it may concern:*

Be it known that I, THOMAS SPENCER, of Syracuse, in the county of Onondaga and State of New York, have invented or discovered a new and useful means, method, or process whereby I neutralize and get rid of the injurious properties in common salt arising from the presence of the chloride of calcium and the chloride of magnesium; and I do hereby describe and ascertain the same in the following words, to wit:

Of all the salts found as impurities in the ordinary salt of commerce, the chloride of magnesium and the chloride of calcium are the most deleterious, on account of their deliquescent properties. The accumulation of dampness and the consequent lumping of ordinary table-salt from the best manufacturers is too well known to enlarge upon, and it has been considered a desideratum worthy the attention of the best chemists to find a means of simply and cheaply getting rid of the difficulty. The well-known chemist Berthier devised a very ingenious method of getting rid of the chloride of magnesium during the "soccage" in the process of evaporation by adding slaked lime to the brine in the pan. It will be obvious that the process is a difficult and tedious one, which is imperfect, the salt still retaining injurious qualities, and adds to the expense of manufacture, and requires skill in the use of it. This process, like all others heretofore essayed, is intended to be employed upon the brine. My new improvement is to be employed upon the salt after it is manufactured, and this alone constitutes an important change, simplifying the manufacture and decreasing the quantity of material necessary to produce the desired result.

I will here briefly state what is well known by all who are conversant with the subject, that as the salt is formed from brine containing the foreign materials above named, it is taken out of the pans into baskets or other suitable receptacles, and the mother-liquor containing them is drained off into the pan again, leaving so much of the chloride of calcium or magnesium as adheres to the crystals of salt, which in most cases is a very small percentage of the whole, but still sufficient to make the salt yielding and impure. Into this salt, after it is properly dried, I put and incorporate by mechanical action, by grinding them together or otherwise, a quantity of carbonate or bicarbonate of soda sufficient for the purpose, (about equal to the chloride above named.) This small quantity acts chemically upon the chloride of calcium and magnesium, and neutralizes its deleterious effects, turning a portion thereof into chloride of sodium (common salt) and the rest into carbonate of lime—a harmless impurity in so trifling a quantity as not to be apreciable in the article of pure chloride of sodium, which is thus rendered anhydrous and will remain dry on exposure to damp atmosphere in transportation, &c.

I do not claim for having made any new discovery of a chemical compound, as the elements and their affinities are all well known to the chemist; but up to this time no economical way has been found to use them in the practical manufacture of salt.

What I do claim, and desire to secure by Letters Patent, is—

Combining the carbonate or bicarbonate of soda with common salt, substantially as and for the purpose set forth.

THOS. SPENCER.

Witnesses:
JULIUS HENNIS,
J. J. GREENUP.